United States Patent
Chuang et al.

(10) Patent No.: US 10,928,844 B2
(45) Date of Patent: Feb. 23, 2021

(54) ELECTRONIC DEVICE AND POWER SUPPLY MODULE THEREOF

(71) Applicant: PEGATRON CORPORATION, Taipei (TW)

(72) Inventors: Tsung-Ta Chuang, Taipei (TW); Shou-Lung Hung, Taipei (TW); Chih-Kun Kuo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/534,964

(22) Filed: Aug. 7, 2019

(65) Prior Publication Data
US 2020/0110430 A1  Apr. 9, 2020

(30) Foreign Application Priority Data

Oct. 9, 2018 (TW) ................................ 10713566.6

(51) Int. Cl.
*G05F 1/575* (2006.01)
*H02J 1/10* (2006.01)

(52) U.S. Cl.
CPC ................ *G05F 1/575* (2013.01); *H02J 1/10* (2013.01); *H02J 1/108* (2013.01)

(58) Field of Classification Search
CPC .. G05F 1/575; H02J 1/10; H02J 1/108; G06F 1/26
See application file for complete search history.

(56) References Cited

U.S. PATENT DOCUMENTS

| 5,864,476 A * | 1/1999 | Busch .................... G05F 1/46 307/109 |
| 6,177,783 B1 * | 1/2001 | Donohue ............... H02J 1/001 323/272 |

(Continued)

FOREIGN PATENT DOCUMENTS

| CN | 2487144 | 4/2002 |
| JP | S60223429 | 11/1985 |

(Continued)

OTHER PUBLICATIONS

"Office Action of Japan Counterpart Application", dated Oct. 13, 2020, p. 1-p. 7.

*Primary Examiner* — Rexford N Barnie
*Assistant Examiner* — Thai H Tran
(74) *Attorney, Agent, or Firm* — J.C. Patents

(57) ABSTRACT

An electronic device includes a device body and a power supply module. The power supply module is coupled to the device body to supply power to the device body. The power supply module includes a plurality of power control circuits. An input end of each of the plurality of power control circuits is configured to receive a power input from a corresponding one of a plurality of power supply apparatuses. An output end of each of the plurality of power control circuits is coupled to the device body. Each of the plurality of power control circuits generates a corresponding power output according to the received power input to jointly supply power in a parallel manner to the device body. Each of the plurality of power control circuits limits, according to corresponding current limit information, a current captured from the corresponding power supply apparatus.

8 Claims, 4 Drawing Sheets

(56) References Cited

U.S. PATENT DOCUMENTS 9,705,345 B2 7/2017 Luo et al.
2015/0188307 A1 7/2015 Luo et al.

FOREIGN PATENT DOCUMENTS

| | | |
|---|---|---|
| JP | 2014068510 | 4/2014 |
| JP | 2014138531 | 7/2014 |
| JP | 2017191476 | 10/2017 |
| TW | 200603524 | 1/2006 |
| TW | 200917613 | 4/2009 |
| TW | I590551 | 7/2017 |

* cited by examiner

ELECTRONIC DEVICE AND POWER SUPPLY MODULE THEREOF

CROSS-REFERENCE TO RELATED APPLICATION

This non-provisional application claims priority under 35 U.S.C. § 119(a) to Patent Application No. 107135666 filed in Taiwan, R.O.C. on Oct. 9, 2018, the entire contents of which are hereby incorporated by reference.

BACKGROUND

Technical Field

The application relates to a power supply technology, and in particular, to a power supply module having a parallel power supply mechanism, and an electronic device using the power supply module.

Related Art

An existing electronic device generally has a plurality of types of different power input ports. The electronic device can be coupled to a plurality of power supply apparatuses through the plurality of power input ports, to receive a plurality of power inputs. However, a power supply circuit in an existing electronic device selects only the power input from one of the power supply apparatuses to supply power to a device body in the electronic device. As a result, the overall performance of the electronic device is inevitably limited by the power supply capability of the selected power supply apparatus.

SUMMARY

In view of this, the application provides an electronic device and a power supply module thereof. The power supply module can generate, according to a plurality of power inputs received, a plurality of corresponding power outputs to jointly supply power in a parallel manner to a device body of the electronic device.

The power supply module of the application is configured to supply power to the device body. The power supply module includes a plurality of power control circuits. An input end of each of the plurality of power control circuits is configured to receive a power input from a corresponding one of a plurality of power supply apparatuses. An output end of each of the plurality of power control circuits is coupled to the device body. Each of the plurality of power control circuits generates a corresponding power output according to the received power input to jointly supply power in a parallel manner to the device body. Each of the plurality of power control circuits limits, according to corresponding current limit information, a current captured from the corresponding power supply apparatus.

The electronic device of the application includes a device body and a power supply module. The power supply module is coupled to the device body to supply power to the device body. The power supply module includes a plurality of power control circuits. An input end of each of the plurality of power control circuits is configured to receive a power input from a corresponding one of a plurality of power supply apparatuses. An output end of each of the plurality of power control circuits is coupled to the device body. Each of the plurality of power control circuits generates a corresponding power output according to the received power input to jointly supply power in a parallel manner to the device body. Each of the plurality of power control circuits limits, according to corresponding current limit information, a current captured from the corresponding power supply apparatus.

Based on the above, the power supply module according to the application can generate a plurality of power outputs according to a plurality of power inputs from a plurality of power supply apparatuses, to jointly supply power in a parallel manner to the device body of the electronic device. In this way, the performance of the device body will not be limited by the power supply capability of a single power supply apparatus, and therefore, the overall performance of the device body can be effectively improved. In addition, because each of the plurality of power supply apparatuses is limited to a respective maximum output power, each of the plurality of power control circuits in the power supply module can limit, according to the corresponding current limit information, the current captured from the corresponding power supply apparatus.

In order to make the aforementioned and other objectives and advantages of the application comprehensible, embodiments accompanied with figures are described in detail below.

BRIEF DESCRIPTION OF THE DRAWINGS

As a part of the specification of the application, the following accompanying drawings illustrate the example embodiments of the application, and the principle of the application is explained by the descriptions of the accompanying drawings and the specification.

DETAILED DESCRIPTION OF THE EMBODIMENTS

To make the content of the application easier to understand, embodiments are described below as examples of the application that can be implemented. In addition, wherever possible, elements, components or steps denoted by the same symbols represent the same or similar parts.

Figure 1:
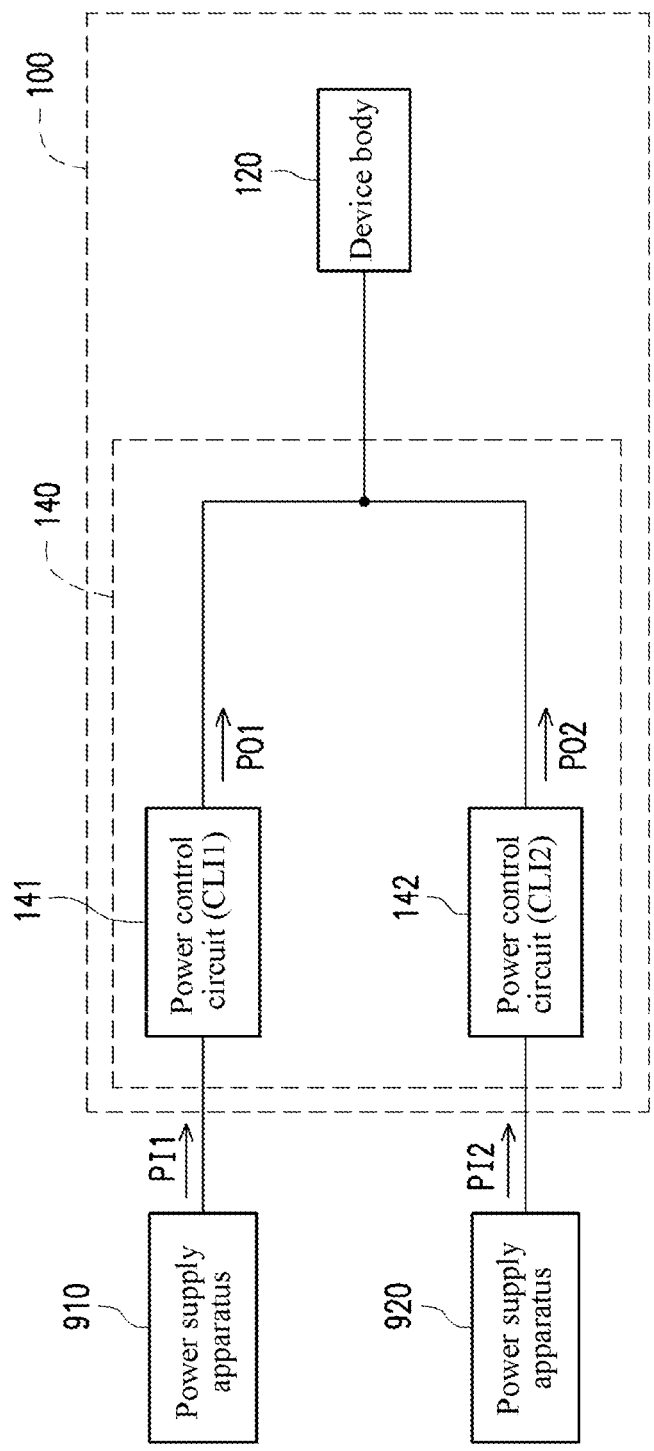
FIG. 1 is a schematic circuit block diagram of an electronic device according to an embodiment of the application.

Refer to FIG. 1. FIG. 1 is a schematic circuit block diagram of an electronic device 100 according to an embodiment of the application. In an embodiment of the application, the electronic device 100 may be a notebook computer, a tablet or the like, but the application is not limited thereto. The electronic device 100 may include a device body 120 and a power supply module 140. The device body 120 includes a circuit configured to perform main functions of the electronic device 100. The power supply module 140 is coupled to the device body 120 to supply power to the device body 120. The power supply module 140 includes a plurality of power control circuits. However, for the ease of description and the brevity of the drawings, the embodiment in FIG. 1 is described by using two power control circuits 141 and 142 as an example. Implementations of cases involving other quantities of power control circuits can be derived from the following description.

An input end of the power control circuit 141 is configured to receive a power input PI1 of a corresponding power supply apparatus 910, and an output end of the power control circuit 141 is coupled to the device body 120. Similarly, an input end of the power control circuit 142 is configured to receive a power input PI2 of a corresponding power supply apparatus 920, and an output end of the power control circuit 142 is coupled to the device body 120. The power control circuits 141 and 142 may respectively generate, according to the received power inputs PI1 and PI2, corresponding power outputs PO1 and PO2 to jointly supply power in a parallel manner to the device body 120. Because the power necessary for the operation of the device body 120 is supplied jointly by the power supply apparatuses 910 and 920, the performance of the device body 120 is not limited by the power supply capability of a single power supply apparatus.

In addition, because the power supply apparatuses 910 and 920 are limited to respective maximum output powers, the power control circuit 141 may limit, according to corresponding current limit information CLI1, a current captured from the power supply apparatus 910, and the power control circuit 142 may limit, according to corresponding current limit information CLI2, a current captured from the power supply apparatus 920.

In an embodiment of the application, the current limit information CLI1 may be, for example, a first reference voltage. The first reference voltage is a maximum output power corresponding to the power supply apparatus 910, but the application is not limited thereto. Similarly, the current limit information CLI2 may be, for example, a second reference voltage. The second reference voltage is a maximum output power corresponding to the power supply apparatus 920, but the application is not limited thereto. The first reference voltage and the second reference voltage may be determined according to practical applications or design requirements.

In an embodiment of the application, the current limit information CLI1 and CLI2 may be, for example, respectively set in the power control circuits 141 and 142, but the application is not limited thereto.

In another embodiment of the application, the apparatus 120 may include a power setting application (not shown). A user may make the device body 120 execute the power setting application, so that a user interface (UI) of the power setting application is displayed on a screen of the device body 120. The user interface of the power setting application may include setting options of the current limit information CLI1 and CLI2. The device body 120 may generate, according to the setting option corresponding to the current limit information CLI1 in the user interface, the corresponding first reference voltage to the power control circuit 141. Similarly, the device body 120 may generate, according to the setting option corresponding to the current limit information CLI2 in the user interface, the corresponding second reference voltage to the power control circuit 142. In this way, the user may click the setting options of the current limit information CLI1 and CLI2 according to the maximum output powers of the power supply apparatuses 910 and 920 to respectively limit the currents captured from the power supply apparatuses 910 and 920.

In an embodiment of the application, the power supply apparatuses 910 and 920 may be, for example, adaptors, USB power delivery apparatuses, wireless power suppliers or the like, but the application is not limited thereto.

In the embodiment shown in FIG. 1, the power control circuit 141 and the power control circuit 142 have similar circuit architectures. Therefore, the power control circuit 141 is used below as an example for explanation, and the implementation and operation of the power control circuit 142 can be derived from the description about the power control circuit 141.

Figure 2:
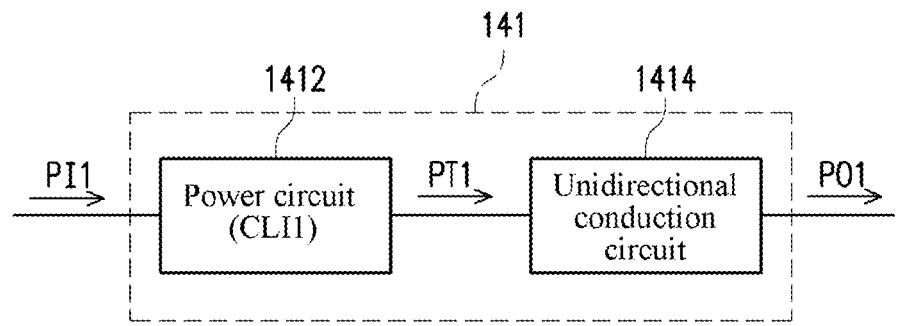
FIG. 2 is a schematic circuit block diagram of a power control circuit according to an embodiment of the application.

Refer to both FIG. 1 and FIG. 2 below. FIG. 2 is a schematic circuit block diagram of the power control circuit 141 according to an embodiment of the application. The power control circuit 141 includes a power circuit 1412 and a unidirectional conduction circuit 1414. The power circuit 1412 is coupled to the input end of the power control circuit 141 to receive the corresponding power input PI1 to provide a first power PT1. The power circuit 1412 may limit, according to corresponding current limit information CLI1, the current captured from the power supply apparatus 910. The unidirectional conduction circuit 1414 is coupled between the power circuit 1412 and the output end of the power control circuit 141, to transmit the first power PT1, as a power output PO1, to the output end of the power control circuit 141 and prevent a reverse current from the output end of the power control circuit 141 to the power circuit 1412.

Figure 3:
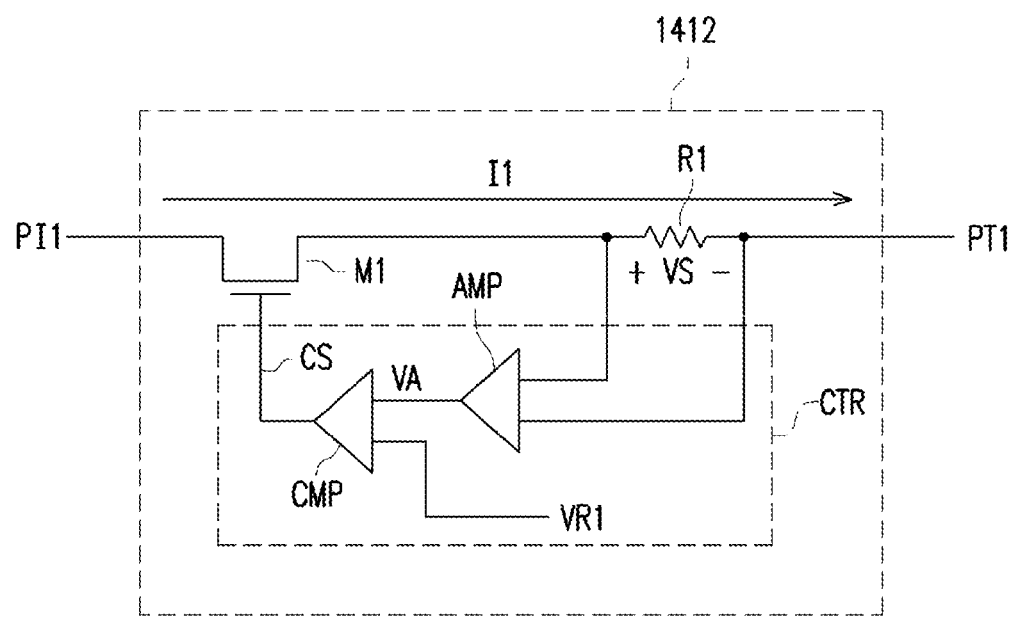
FIG. 3 is a schematic diagram of a circuit architecture of a power circuit according to an embodiment of the application.

Refer to both FIG. 2 and FIG. 3 below. FIG. 3 is a schematic diagram of a circuit architecture of the power circuit 1412 according to an embodiment of the application. The power circuit 1412 includes a transistor M1, a sensing resistor R1 and a current control circuit CTR. A first end of the transistor M1 is coupled to the input end of the power control circuit 141. A control end of the transistor M1 is configured to receive a control signal CS. The sensing resistor R1 is coupled between a second end of the transistor M1 and the unidirectional conduction circuit 1414 and is configured to sense an output current I1 of the power circuit 1412 so as to generate a sensing voltage VS. The current control circuit CTR is coupled to two ends of the sensing resistor R1 to receive the sensing voltage VS, and is configured to generate the control signal CS according to the sensing voltage VS and a first reference voltage VR1 (that is, the current limit information CLI1) to control an impedance value of the transistor M1, thereby limiting the value of the output current I1.

Further, the current control circuit CTR includes an amplifier AMP and a comparator CMP. The amplifier AMP is coupled to the two ends of the sensing resistor R1 to amplify the sensing voltage VS to generate an amplified voltage VA. The comparator CMP is coupled to the amplifier AMP to receive the amplified voltage VA and is configured to receive the first reference voltage VR1. The comparator CMP compares the amplified voltage VA with the first reference voltage VR1 to generate the control signal CS.

In particular, when the value of the output current I1 is greater than a current limit value, the amplified voltage VA generated by the amplifier AMP will be higher than the first reference voltage VR1. In this case, the comparator CMP will adjust the voltage of the control end of the transistor M1 through the control signal CS, so as to control the impedance value of the transistor M1, thereby limiting the value of the output current I1 to the above current limit value (that is, limiting the current captured from the power supply apparatus 910). It can be understood that the value of first reference voltage VR1 is the product of the above current limit value, a resistance value of the sensing resistor R1 and an amplification factor of the amplifier AMP.

It should be noted that the circuit architecture of the power circuit 1412 shown in FIG. 3 is only used as an example and is not intended to limit the application. In other embodiments of the application, the power circuit 1412 may also be implemented by using a current limiter known to a person of ordinary skill in the art.

In another embodiment of the application, the power circuit 1412 of FIG. 2 may also be implemented by using a low dropout regulator having a current limiting function.

In still another embodiment of the application, the power circuit 1412 of FIG. 2 may also be implemented by using a DC to DC converter having a current limiting function, so as to improve the power conversion efficiency of the power control circuit 141.

In an embodiment of the application, the unidirectional conduction circuit 1414 of FIG. 2 may be implemented by using a diode, but the application is not limited thereto. In other embodiments of the application, the unidirectional conduction circuit of FIG. 2 may also be implemented by using a unidirectional power transmission circuit known to a person of ordinary skill in the art.

Figure 4:
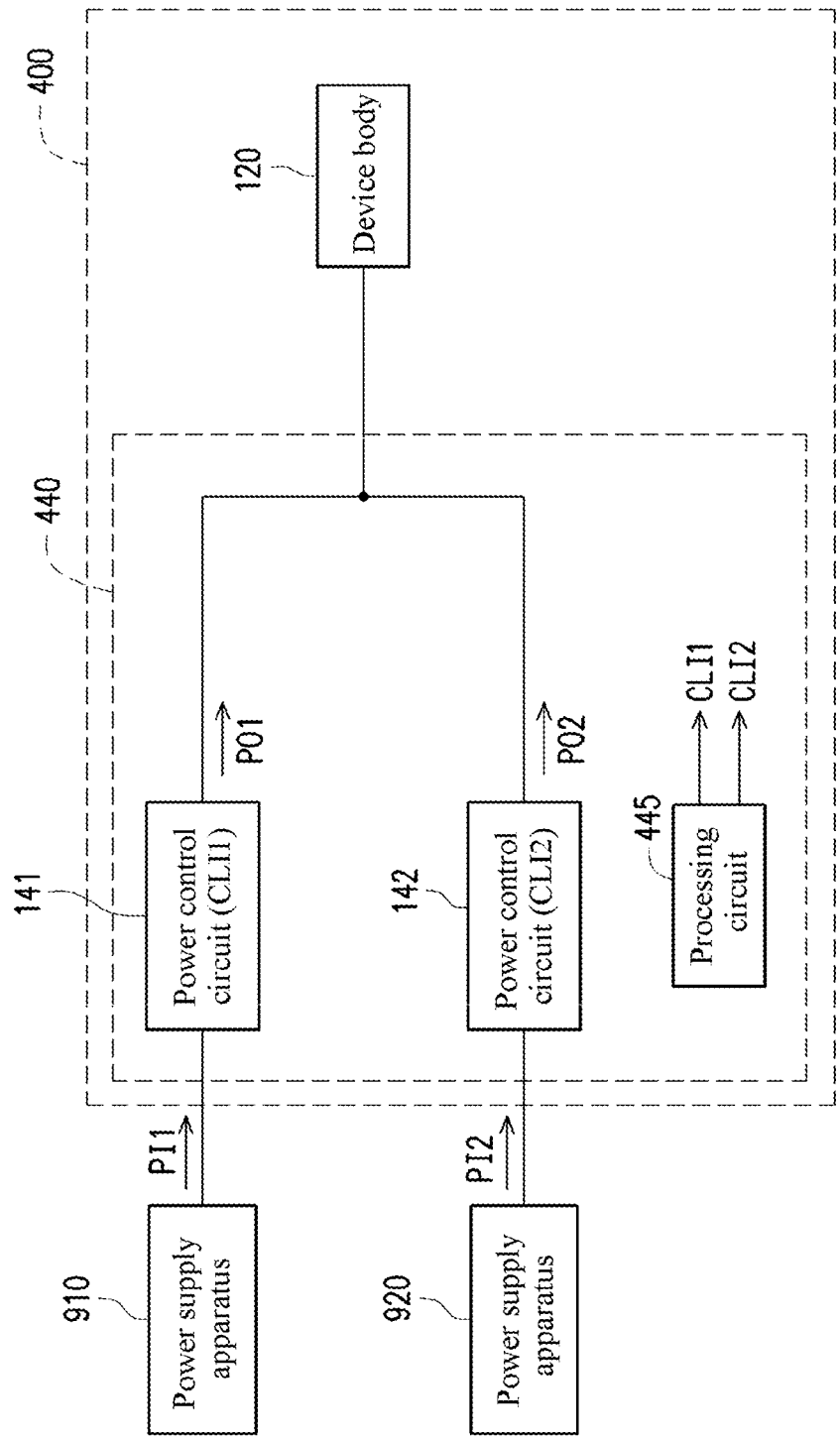
FIG. 4 is a schematic circuit block diagram of an electronic device according to another embodiment of the application.

Refer to FIG. 4. FIG. 4 is a schematic circuit block diagram of an electronic device 400 according to another embodiment of the application. The electronic device 400 may include a device body 120 and a power supply module 440. The device body 120 and the power supply module 440 of FIG. 4 are respectively similar to the device body 120 and the power supply module 140 of FIG. 1, except that the power supply module 440 further includes a processing circuit 445. The processing circuit 445 is coupled to power control circuits 141 and 142. The processing circuit 445 is configured to provide the current limit information CLI1 of the power control circuit 141 and the current limit information CLI2 of the power control circuit 142. In addition, for other implementation details and operation of the device body 120 and the power supply module 440 of FIG. 4, reference can be made to the above descriptions about FIG. 1 to FIG. 3 and the details will not be described herein again.

In an embodiment of the application, the processing circuit 445 may be hardware, firmware, or software or machine executable code stored in a memory and loaded and executed by a microcontroller unit or an embedded controller. If implemented by a hardware, the processing circuit 445 may be implemented by a single integrated circuit chip or a plurality of circuit chips, but the application is not limited thereto. The plurality of circuit chips or the single integrated circuit chip may be implemented by using an application-specific integrated circuit (ASIC), a field programmable gate array (FPGA) or a complex programmable logic device (CPLD). The memory may be, for example, a random access memory (RAM), a read-only memory (ROM), a flash memory or the like.

Figure 5:
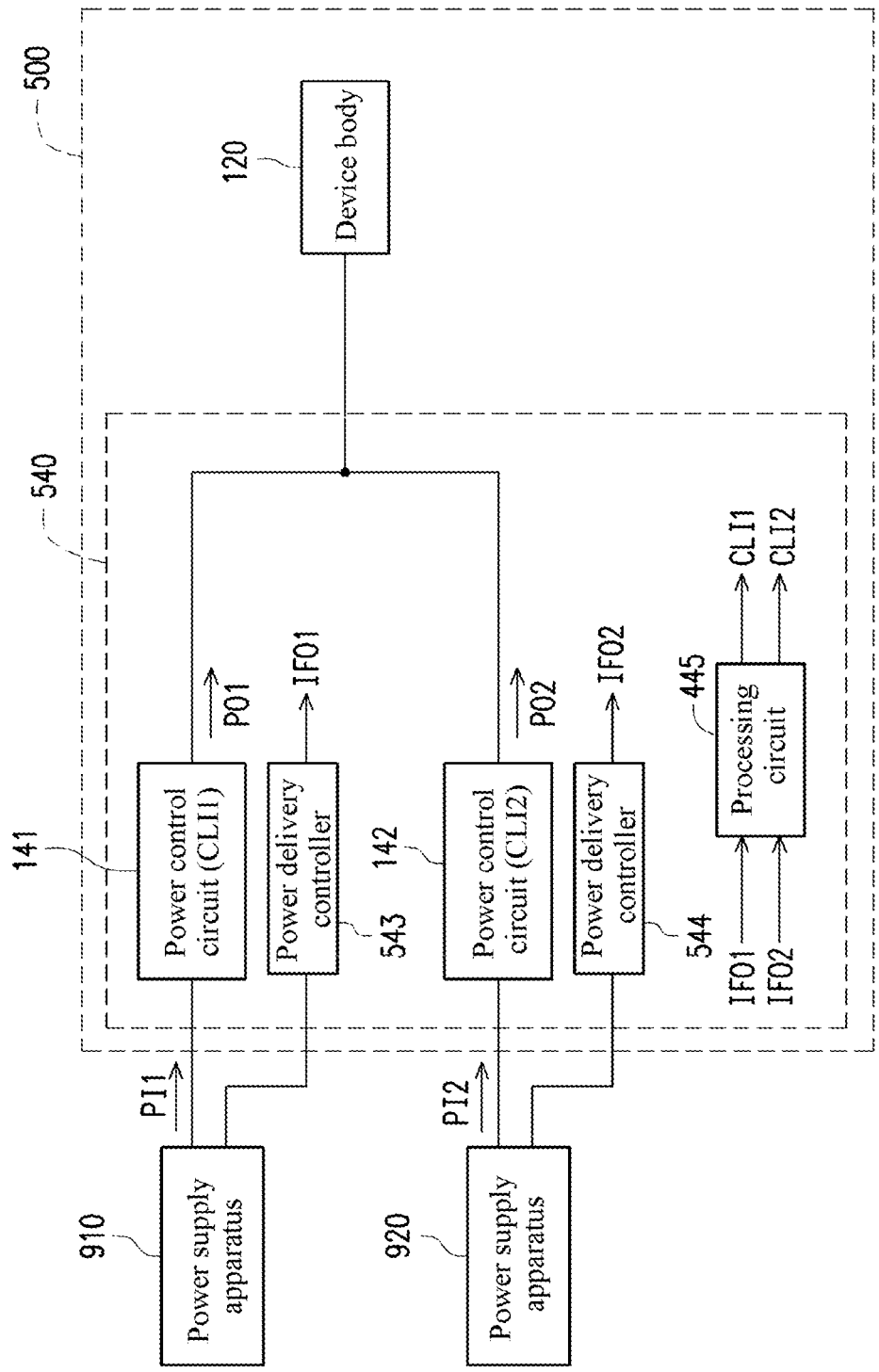
FIG. 5 is a schematic circuit block diagram of an electronic device according to still another embodiment of the application.

Refer to FIG. 5. FIG. 5 is a schematic circuit block diagram of an electronic device 500 according to another embodiment of the application, in which power supply apparatuses 910 and 920 are USB power delivery apparatuses. The electronic device 500 may include a device body 120 and a power supply module 540. The device body 120 and the power supply module 540 of FIG. 5 are respectively similar to the device body 120 and the power supply module 440 of FIG. 4, except that the power supply module 540 further includes power delivery controllers (PD controller) 543 and 544. The power delivery controller 543 is coupled to the power supply apparatus 910 and the processing circuit 445. The power delivery controller 543 communicates with the power supply apparatus 910 to obtain power delivery information IFO1 of the power supply apparatus 910. The power delivery information IFO1 may include output voltage information and output current information (or maximum output power information) of the power supply apparatus 910. Similarly, the power delivery controller 544 is coupled to the power supply apparatus 920 and the processing circuit 445. The power delivery controller 544 communicates with the power supply apparatus 920 to obtain power delivery information IFO2 of the power supply apparatus 920. The power delivery information IFO2 may include output voltage information and output current information (or maximum output power information) of the power supply apparatus 920. The power delivery controllers 543 and 544 may respectively provide the power delivery information IFO1 and IFO2 to the processing circuit 445. In this way, the processing circuit 445 may respectively provide the current limit information CLI1 and CLI2 according to the power delivery information IFO1 and IFO2.

For example, it is assumed that the power supply apparatus 910 can provide an output voltage of 5 volts and an output current of 4 amperes, that is, a maximum output power that the power supply apparatus 910 can provide is 20 watts. In this case, the power delivery controller 543 may communicate with the power supply apparatus 910 to obtain the power delivery information IFO1 (that is, the output voltage of 5 volts and the output current of 4 amperes) of the power supply apparatus 910. Therefore, the processing circuit 445 may provide, according to the output current information (that is, 4 amperes) in the power delivery information IFO1 and a look-up table, the current limit information CLI1 corresponding to 4 amperes to the power control circuit 141. In this way, the power control circuit 141 may limit, according to the current limit information CLI1 corresponding to 4 amperes, the maximum current captured from the power supply apparatus 910 to 4 amperes, so as not to exceed the maximum output power (20 watts) that the power supply apparatus 910 can provide. For the current limiting operation of the power control circuit 141, reference can be made to the above descriptions about FIG. 1 to FIG. 3, and the details will not be described herein again.

In an embodiment of the application, the power delivery controllers 543 and 544 may be implemented by using USB power delivery controllers known to a person of ordinary skill in the art, but the application is not limited thereto.

In an embodiment of the application, the power delivery information IFO1 and IFO2 may be, for example, any one of 5 profiles complying with the USB Power Delivery 3.1 Specification, but the application is not limited thereto.

Based on the above, in the electronic device and the power supply module thereof provided by embodiments of the application, the power supply module can generate a plurality of power outputs according to a plurality of power inputs from a plurality of power supply apparatuses, to jointly supply power in a parallel manner to the device body of the electronic device. In this way, the performance of the device body will not be limited by the power supply capability of a single power supply apparatus, and therefore, the overall performance of the device body can be effectively improved. In addition, because each of the plurality of power supply apparatuses is limited to a respective maximum output power, each of the plurality of power control circuits in the power supply module can limit, according to the corresponding current limit information, the current captured from the corresponding power supply apparatus.

The application being thus described, it will be obvious that the same may be varied in many ways. Such variations are not to be regarded as a departure from the spirit and scope of the application, and all such modifications as would be obvious to one skilled in the art are intended to be included within the scope of the following claims.

LIST OF REFERENCE NUMERALS 100, 400, 500: electronic device
120: device body
140, 440, 540: power supply module
141, 142: power control circuit
1412: power circuit
1414: unidirectional conduction circuit
445: processing circuit
543, 544: power delivery controller
910, 920: power supply apparatus
AMP: amplifier
CMP: comparator
CLI1, CLI2: current limit information
CS: control signal
CTR: current control circuit
I1: output current
IFO1, IFO2: power delivery information
M1: transistor
PI1, PI2: power input
PO1, PO2: power output
PT1: first power
R1: sensing resistor
VA: amplified voltage
VR1: first reference voltage
VS: sensing voltage

What is claimed is:

1. A power supply module, configured to supply power to a device body, and comprising:
   a plurality of power control circuits, wherein an input end of each of the plurality of power control circuits is configured to receive a power input from a corresponding one of a plurality of power supply apparatuses, an output end of each of the plurality of power control circuits is coupled to the device body, each of the plurality of power control circuits generates a corresponding power output according to the received power input to jointly supply power in a parallel manner to the device body, and each of the plurality of power control circuits limits, according to corresponding current limit information, a current captured from the corresponding power supply apparatus, wherein each of the plurality of power control circuits comprises:
      a power circuit coupled to the input end of the power control circuit to receive the corresponding power input to provide a first power, wherein the power circuit limits, according to the corresponding current limit information, the current captured from the corresponding power supply apparatus; and
      a unidirectional conduction circuit coupled between the power circuit and the output end of the power control circuit, to transmit the first power, as the power output, to the output end and prevent a reverse current from the output end to the power circuit; and
   a processing circuit coupled to the plurality of power control circuits, and configured to provide the current limit information of each of the plurality of power control circuits; and
   a plurality of power delivery controllers coupled to the processing circuit, wherein each of the plurality of power delivery controllers is configured to communicate with the corresponding power supply apparatus, so as to obtain power delivery information from the corresponding power supply apparatus,
   wherein the plurality of power delivery controllers provide the power delivery information to the processing circuit, and the processing circuit provides the current limit information according to the power delivery information.

2. The power supply module according to claim 1, wherein the current limit information is a reference voltage, and the power circuit comprises:
   a transistor, wherein a first end of the transistor is coupled to the input end of the power control circuit, and a control end of the transistor is configured to receive a control signal;
   a sensing resistor coupled between a second end of the transistor and the unidirectional conduction circuit, and configured to sense an output current of the power circuit to generate a sensing voltage; and
   a current control circuit coupled to two ends of the sensing resistor to receive the sensing voltage, and configured to generate the control signal according to the reference voltage and the sensing voltage to control an impedance value of the transistor.

3. The power supply module according to claim 2, wherein the current control circuit comprises:
   an amplifier coupled to the two ends of the sensing resistor to amplify the sensing voltage to generate an amplified voltage; and
   a comparator coupled to the amplifier to receive the amplified voltage and configured to receive the reference voltage, wherein the comparator compares the amplified voltage with the reference voltage to generate the control signal.

4. The power supply module according to claim 1, wherein the power circuit is a DC to DC converter or a low dropout regulator.

5. An electronic device, comprising:
   a device body; and
   a power supply module coupled to the device body to supply power to the device body, wherein the power supply module comprises:
      a plurality of power control circuits, wherein an input end of each of the plurality of power control circuits is configured to receive a power input from a corresponding one of a plurality of power supply apparatuses, an output end of each of the plurality of power control circuits is coupled to the device body, each of the plurality of power control circuits generates a corresponding power output according to the received power input to jointly supply power in a parallel manner to the device body, and each of the plurality of power control circuits limits, according to corresponding current limit information, a current captured from the corresponding power supply apparatus, wherein each of the plurality of power control circuits comprises:
         a power circuit coupled to the input end of the power control circuit to receive the corresponding power input to provide a first power, wherein the power circuit limits, according to the corresponding current limit information, the current captured from the corresponding power supply apparatus; and
         a unidirectional conduction circuit coupled between the power circuit and the output end of the power control circuit, to transmit the first power, as the power output, to the output end and prevent a reverse current from the output end to the power circuit;

a processing circuit coupled to the plurality of power control circuits, and configured to provide the current limit information of each of the plurality of power control circuits; and a plurality of power delivery controllers coupled to the processing circuit, wherein each of the plurality of power delivery controllers is configured to communicate with the corresponding power supply apparatus, so as to obtain power delivery information from the corresponding power supply apparatus, wherein the plurality of power delivery controllers provide the power delivery information to the processing circuit, and the processing circuit provides the current limit information according to the power delivery information.

6. The electronic device according to claim 5, wherein the current limit information is a reference voltage, and the power circuit comprises:

a transistor, wherein a first end of the transistor is coupled to the input end of the power control circuit, and a control end of the transistor is configured to receive a control signal;

a sensing resistor coupled between a second end of the transistor and the unidirectional conduction circuit, and configured to sense an output current of the power circuit to generate a sensing voltage; and a current control circuit coupled to two ends of the sensing resistor to receive the sensing voltage, and configured to generate the control signal according to the reference voltage and the sensing voltage to control an impedance value of the transistor.

7. The electronic device according to claim 6, wherein the current control circuit comprises:

an amplifier coupled to the two ends of the sensing resistor to amplify the sensing voltage to generate an amplified voltage; and a comparator coupled to the amplifier to receive the amplified voltage and configured to receive the reference voltage, wherein the comparator compares the amplified voltage with the reference voltage to generate the control signal.

8. The electronic device according to claim 5, wherein the power circuit is a DC to DC converter or a low dropout regulator.

* * * * *